(12) United States Patent
Bahari

(10) Patent No.: US 12,341,773 B1
(45) Date of Patent: Jun. 24, 2025

(54) SYSTEMS AND METHODS FOR DECENTRALIZED NETWORK MANAGEMENT

(71) Applicant: Bijan Reza Bahari, Laurel, MD (US)

(72) Inventor: Bijan Reza Bahari, Laurel, MD (US)

( * ) Notice: Subject to any disclaimer, the term of this patent is extended or adjusted under 35 U.S.C. 154(b) by 340 days.

(21) Appl. No.: 17/578,377

(22) Filed: Jan. 18, 2022

Related U.S. Application Data

(60) Provisional application No. 63/138,480, filed on Jan. 17, 2021.

(51) Int. Cl.
*H04L 9/40* (2022.01)
*G06F 21/40* (2013.01)

(52) U.S. Cl.
CPC .......... *H04L 63/0876* (2013.01); *G06F 21/40* (2013.01)

(58) Field of Classification Search
CPC ... H04L 63/08; H04L 63/083; H04L 63/0876; H04L 63/0884; H04L 63/10; H04L 63/105; G06F 21/40
See application file for complete search history.

(56) References Cited

U.S. PATENT DOCUMENTS

| | | | | |
|---|---|---|---|---|
| 10,965,683 B1 * | 3/2021 | Castonguay | ............ | G06F 21/40 |
| 11,568,038 B1 * | 1/2023 | Kulkarni | ............... | H04L 9/3271 |
| 11,722,491 B1 * | 8/2023 | Al-Rashid | ........... | H04L 63/1433 |
| 2009/0193514 A1 * | 7/2009 | Adams | ..................... | G06F 21/40 |
| | | | | 726/17 |
| 2013/0074162 A1 | 3/2013 | Falk | | |
| 2016/0110544 A1 * | 4/2016 | Singla | ................... | G06F 21/554 |
| | | | | 726/23 |
| 2016/0224949 A1 * | 8/2016 | Thomas | ............... | G06Q 20/027 |
| 2017/0257364 A1 * | 9/2017 | Ligatti | ................ | G06F 21/6281 |
| 2018/0083965 A1 | 3/2018 | Donovan | | |
| 2019/0281028 A1 | 9/2019 | Gillan et al. | | |
| 2019/0379545 A1 | 12/2019 | Wong | | |
| 2020/0027091 A1 | 1/2020 | Hassani et al. | | |
| 2020/0344055 A1 | 10/2020 | Topps | | |
| 2021/0097795 A1 | 4/2021 | Manchovski | | |
| 2021/0126916 A1 | 4/2021 | Yang et al. | | |
| 2021/0243026 A1 * | 8/2021 | Mohassel | ................ | H04L 9/085 |

* cited by examiner

*Primary Examiner* — Boris D Grijalva Lobos
(74) *Attorney, Agent, or Firm* — Jon E. Holland; Butler Snow LLP

(57) ABSTRACT

A system for providing decentralized network management comprises a private, secure network that has a plurality of authentication nodes that collectively authenticate client devices or perform other security functions. That is, the security functions are decentralized such that they are performed by a plurality of authentication nodes that communicate with one another to arrive at a consensus for a given security action, such as whether to authenticate a user. Decentralizing the security functions generally helps to increase the security and robustness of the network. In this regard, even if a hacker is able to access and compromise an authentication node, the other authentication nodes may act to prevent the hacker from using the compromised node to perform harmful or unauthorized actions. In addition, if any of the authentication nodes fails, the other authentication nodes may continue performing security functions allowing the network to recover from the failure.

9 Claims, 4 Drawing Sheets

SYSTEMS AND METHODS FOR DECENTRALIZED NETWORK MANAGEMENT

CROSS REFERENCE TO RELATED APPLICATION

This applicant claims priority to U.S. Provisional Patent Application No. 63/138,480, entitled "A Decentralized Method for identity, Access and Authentication Management" and filed on Jan. 17, 2021, which is incorporated herein by reference.

RELATED ART

Business organizations often use a secure, private network to provide services to clients. As an example, a bank or other financial institution may have a secure, private network to maintain financial accounts and provide services related to the financial accounts, such as fund transfers. Such private networks may have many nodes (e.g., computers) that communicate with remote client devices to perform various functions associated with the services being provided. It is generally desirable to prevent unauthorized access to such nodes in order to protect sensitive information stored or processed by the nodes and to prevent various malicious actions by hackers that could compromise security and performance of the nodes.

In a centralized network architecture, the client devices connect to the nodes through a centralized server, referred to hereafter as "security server," that provides various authentication and security functions in order to prevent unauthorized access to the nodes. For example, when a client device initially tries to connect to the network, the security server may require the client device to provide sufficient information, such as a valid username and password, to authenticate the client device before allowing it to connect to and communicate with any of the nodes. That is, the server functions as a firewall for preventing unauthorized users from gaining access to the nodes of the network.

A centralized network architecture as described can work well to prevent at least some attacks. However, using a centralized security server also has some notable drawbacks. For example, if a hacker is able to compromise the security server or circumvent the security measures of such server, then the hacker may be able to access the nodes being protected by the security server. In addition, if the security server fails, then access to the network may be lost for a period of time until the failure condition can be diagnosed and repaired. Thus, the security server can become a single point of failure that can jeopardize the operation and security of the entire network. Techniques for increasing network robustness and security are generally desired.

DETAILED DESCRIPTION

The present disclosure generally pertains to system and methods for providing decentralized management of networks. In some embodiments of the present disclosure, a private, secure network has a plurality of nodes, including at least some nodes, referred to herein as "authentication nodes" for simplicity of illustration, that collectively authenticate client devices or perform other security functions. That is, the security functions are decentralized such that they are performed by a plurality of authentication nodes that communicate with one another to arrive at a consensus for a given security action, such as whether to authenticate a user. Decentralizing the security functions can help to increase the security and robustness of the network. In this regard, even if a hacker is able to access and compromise an authentication node, the other authentication nodes may act to prevent the hacker from using the compromised node to perform harmful or unauthorized actions. In addition, if any of the authentication nodes fails, the other authentication nodes may continue performing security functions allowing the network to recover from the failure.

In some embodiments, the authentication nodes communicate with one another within the secure network in order to verify each other's configuration and/or operations. If any authentication node is deemed to be compromised, such compromised node may be blacklisted by the other nodes, thereby preventing the blacklisted node from performing one or more operations that could be harmful to the network. As an example, the other nodes may no longer use the blacklisted nodes for one or more security actions until such node has been inspected by an administrator.

In some embodiments, any node of the secure network may function as an authentication node for approving a certain security action, such as authentication of a client device. In addition, a consensus of at least a threshold number of authentication nodes may be required before the security action is permitted. Thus, even if a node fails or is blacklisted, there may be a sufficient number of other nodes available to arrive at a consensus for the security action. In some embodiments, the threshold number of authentication nodes required to approve a given security action may be dynamically adjusted based on one or more factors. As an example, as the size of the network changes, the threshold number of authentication nodes for approving a security action may be changed.

Figure 1:
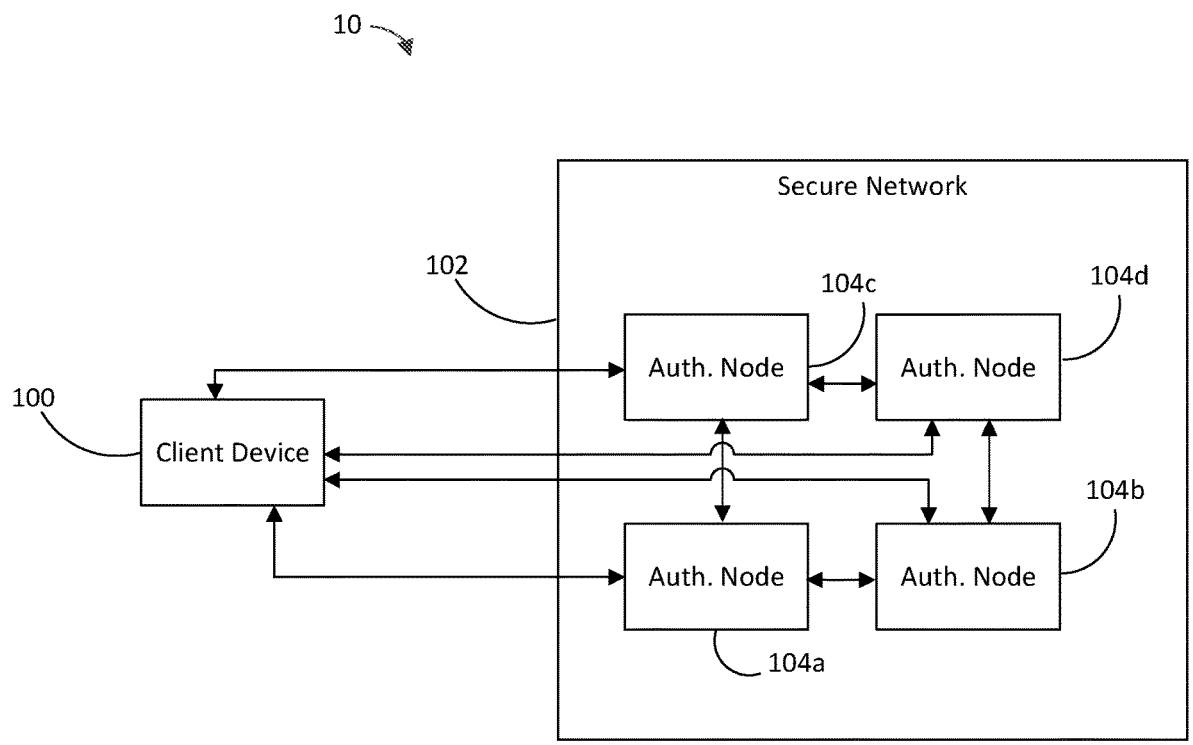
FIG. 1 is a block diagram illustrating an exemplary embodiment of a system for decentralized network management of a secure network.

FIG. 1 depicts a block diagram of a decentralized network management system 10. Specifically, FIG. 1 depicts a client device 100 and a private, secure network 102 that has a plurality of nodes, including a plurality of authentication nodes 104a-d, as will be described later. Each node of the network 102 may comprise one or more computers, such as servers, laptops, desktops, mobile devices, smart devices, wearable devices, PDAs, etc., configured to communicate with other nodes of the network 102. The nodes of the network 102 may use a common protocol shared among the devices present on the network 102, such as TCP/IP, FTP, HTTP/HTTPS, SMTP, UDP, etc.

At least some of the nodes, referred to herein as "authentication nodes" for simplicity of illustration, participate in the authentication of one or more client devices 100. In some embodiments, any node of the network 102 may function as an authentication node for authenticating a respective client device 100, but it is possible to preselect or designate which nodes are to function as authentication nodes for authenticating one or more client devices 100. Authentication may be performed using one or more known authentication methods, such as password-based authentication, multi-factor authentication, certificate-based authentication, biometric authentication, token-based authentication, single sign-on, personal identification number, etc. Although FIG. 1 only shows four authentication nodes 104a-d for simplicity of illustration, in other embodiments, other numbers of authentication nodes may be used. Note that the authentication nodes 104a-d may be located at a single location or may be distributed across several different locations. As an example, it is possible for one node of the secure network 102 to communicate with other nodes of the secure network 102 using another network, such as the Internet or other type of network. Note that, although all nodes in FIG. 1 are labeled authentication nodes 104a-d, as noted above, it is possible that at least some nodes of the network 102 do not function as authentication nodes.

Referring to FIG. 1, a client device 100 may be any device requesting to gain access to the secure network 102. In this regard, a client device 100 may be implemented as a computer, such as a laptop, desktop, mobile device, smart device, wearable device, PDA, etc. capable of communicating with the nodes of the network 102. Note that such communication may occur through one or more private or non-private networks (not shown in FIG. 1) between the client device 100 and the secure network 102, such as a cellular network, the Internet, or other type of network.

Figure 2:
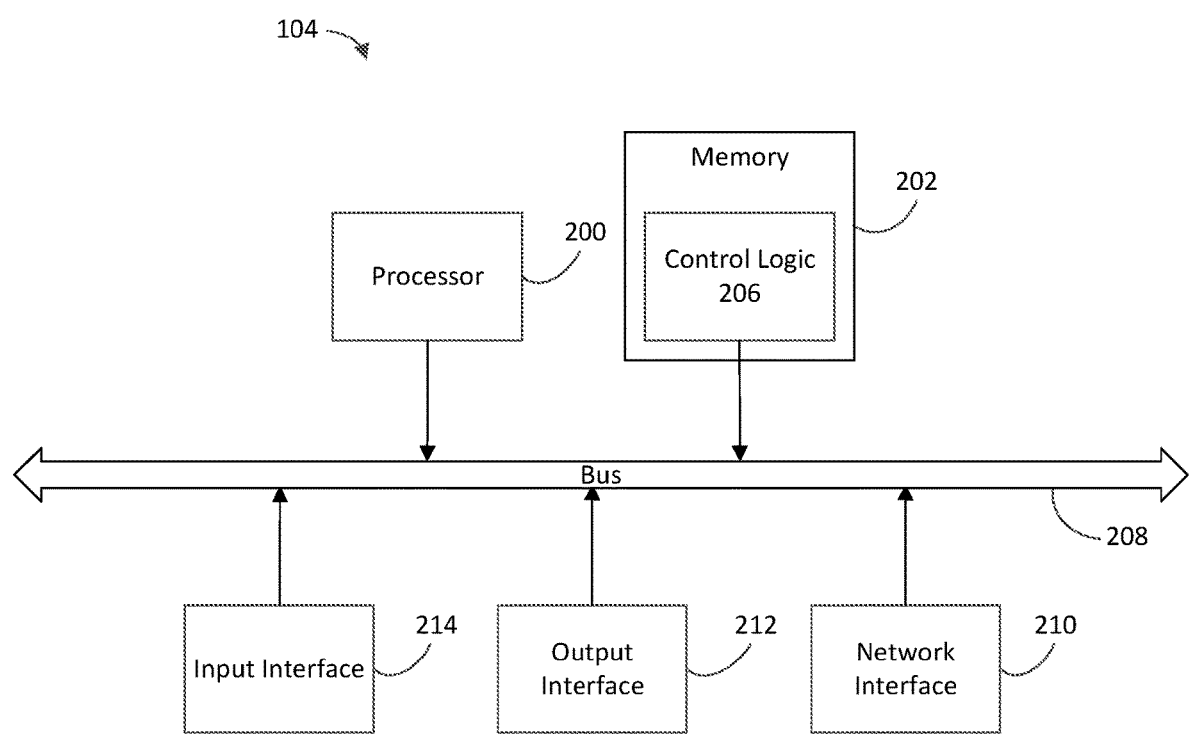
FIG. 2 is a block diagram illustrating an exemplary embodiment of an authentication node, such as is shown in FIG. 1.

FIG. 2 shows an exemplary embodiment of an authentication node 104, which may be used to implement any of the authentication nodes 104a-d depicted by FIG. 1. The node 104 comprises at least one input interface 214, output interface 212, network interface 210, processor 200, and memory 202. The node 104 also comprises control logic 206 for generally controlling the operation of the node 104, as will be described in more detail hereafter. The control logic 206 can be implemented in software, hardware, firmware, or any combination thereof. In the exemplary node 104 illustrated by FIG. 2, the control logic 206 is implemented in software and stored in memory 202.

Note that the control logic 206, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary node 104 depicted by FIG. 2 comprises at least one conventional processor 200, such as a digital signal processor (DSP) or a central processing unit (CPU), that communicates to and drives the other elements within the node 104 via a local interface 208, which can include at least one bus. The processor 200 is configured to retrieve software instructions from the memory 202, such as instructions of the control logic 206 when the control logic 206 is implemented in software, and execute the instructions to perform the functions defined by the software. Furthermore, an input interface 214, for example, a keyboard or a mouse, can be used to input data from a user of the node 104, and an output interface 212, for example, a printer, monitor, liquid crystal display (LCD), or other display apparatus, can be used to output data to the user. In some embodiments, the input interface 214 and the output interface 212 may be integrated, such as a touchscreen that may be used to both display outputs and receive inputs. Further, a network interface 210, such as at least one modem or radio, may be used to exchange data with other nodes of the network 102 and/or to communicate with systems or devices, such as client devices 100, external to the network 102.

As will be described in more detail below, an authentication node 104 of FIG. 1 may participate in the verification of a user request received from an external client device 100. In this regard, a client device 100 may seek to access one or more nodes of the nodes 104, and the authentication node 104 may communicate with other authentication nodes of the network 102 in order to come to a consensus as to whether the client device 100 should be authenticated and thus granted access to the resources of the network 102 via a communication session between the client device 100 and the network 102.

Figure 3A:
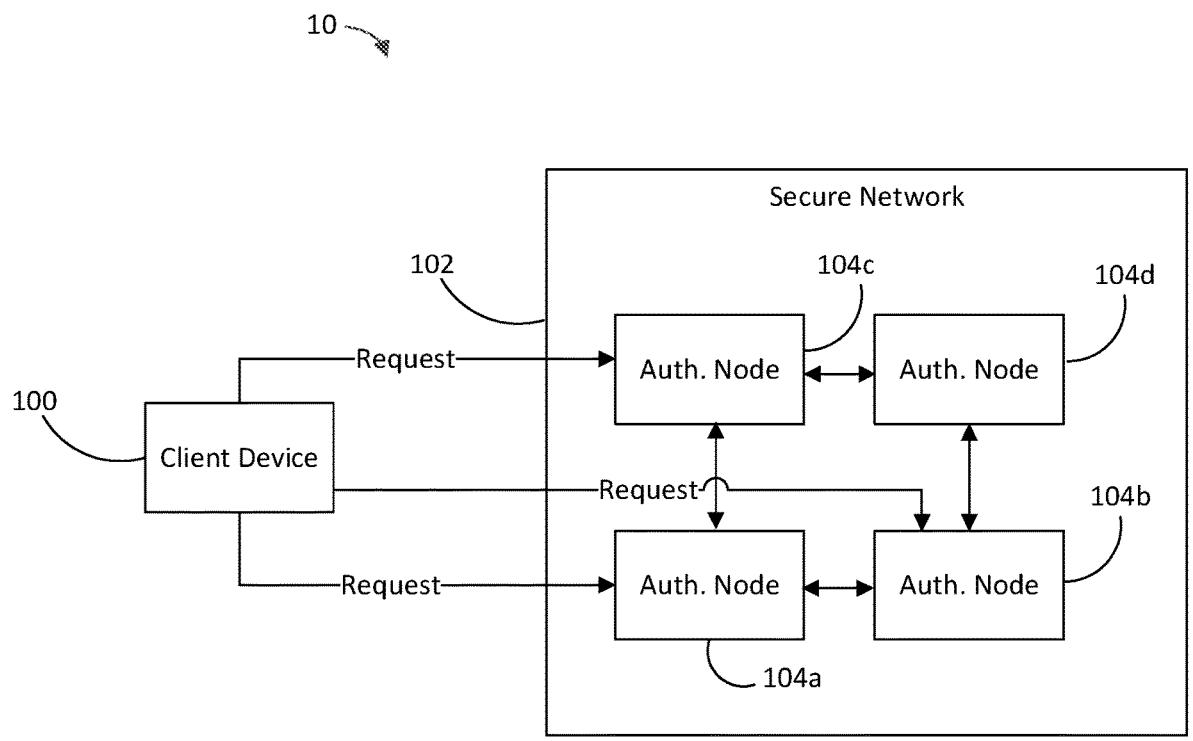
FIG. 3A is a block diagram illustrating the system of FIG. 1 communicating requests for access to the secure network.

FIG. 3A depicts an exemplary embodiment of a decentralized network management system 10. For illustrative purposes, assume that a user of the client device 100 desires to connect to the secure network 102 in order to access the nodes of the network 102. As an example, the user may wish to connect to the network 102 so that the nodes of the network 102 may perform a service for the user. Specifically, the secure network 102 might be used to provide a banking or financial service for which the user of the client device 100 desires to communicate with the network 102 to access his or her account, such as to make a payment from the account or to check his or her account balance or other sensitive information. In other embodiments, other types of services that require the network 102 to store or process sensitive information are possible.

As noted above, user authentication may be achieved in some embodiments of the network 102 through a consensus of at least a threshold number ("TH") of authentication nodes 104a-d. In the embodiment depicted by FIG. 3A, the client device 100 is configured to communicate with at least the threshold number of authentication nodes 104a-d within the secure network 102 in order to send a request, referred to hereafter as "access request," for accessing the network 102 in a communication session. If a number of authentication nodes exceeding the threshold TH authenticate the client device 100 as being associated with an authorized user, then the client device 100 may be granted access for a session with the network 102. During such session, the client device 100 is permitted to access the resources of the network 102 as appropriate for providing the desired service to the user, as will be described in more detail below.

Note that there are various techniques that can be used for the client device 100 to identify the authentication nodes 104a-d that are to be used for authentication. In some embodiments, the client device 100 is configured to communicate with the network 102 to discover the presence of a number ("n") of nodes, where n may be greater than or equal to the threshold TH required for authentication. In this regard, there exists known protocols for node discovery that may be used to discover the presence of nodes on a network, and the client device 100 may be configured to use such known protocols to discover the presence of the authentication nodes 104a-d. As an example, the client device 100 may use zero-configuration networking, such as the bonjour method, or multicast DNS where each node of the network 102 that receives a multicast message transmitted by the client device 100 responds with its capability to validate credentials. The client device 100 may also discover authentication nodes 104a-d using a distributed hash table (DHT), such as Kademelia, or peer discovery using boot nodes (not shown) on the secure network 102.

In some embodiments, one or more nodes of the network 102 may store or otherwise maintain a list of authentication nodes 104a-d that the client device 100 may use in order to request authentication. Such list may be updated from time-to-time by the nodes of the network 102 to account for nodes 104*a-d* that may go offline due to a node failure or other reason. When the client device 100 desires to access the network 102, the client device 100 may access a node that maintains the list of authentication nodes 104*a-d* and may then use the list to attempt authentication. In other embodiments, other techniques may be used by the client device 100 to discover authentication nodes 104*a-d*. As an example, in some embodiments, a list of authentication nodes 104*a-d* may be predefined and stored at the client device 100.

Note that communication between the client device 100 and the nodes of the network 102 may be achieved using any known protocol, including the use of unicast or multicast messaging. For example, using unicast or directed multicast (e.g., a multicast message identifies a group (e.g., one or more) of nodes to receive and process the message), the client device 100 may be able to transmit a message to a specific authentication node 104*a-d* or group of authentication nodes 10*a-d*. Such message may include a source address (e.g., a MAC address of the client device 100) that uniquely identifies the client device 100 and a destination address that uniquely identifies the authentication node 104*a-d* or group of authentication nodes 104*a-d* that is to receive the message. Using similar techniques, an authentication node 104*a-d* may direct a message to the client device 100 or to another node or group of nodes of the network 102 as may be desired. In some embodiments, at least one of the nodes of the secure network 102 comprises one or more gateways (not specifically shown) that receive messages from sources external to the network 102 and forward the messages as appropriate through the network 102 such that they arrive at their intended destination nodes. A gateway may also receive messages from any of the nodes 104*a-d* and send the messages out of the network 102 for reception by the client device 100 or other devices external to the network 102.

Once the client device 100 has identified authentication nodes 104*a-d* for use in authentication, the client device 100 is configured to communicate with the identified authentication nodes 104*a-d* to request access to the network 102. For illustrative purposes, assume that at least three authentication nodes 104*a-d* are required for authentication and that the client device 100 has identified each of the authentication nodes 104*a-d*. Initially, the client 100 device may request authentication from any three of the authentication nodes 104*a-d* or, if desired, the client device 100 may request access from more than three of the authentication nodes 104*a-d*. For illustrative purposes, assume that the client device transmits an access request to the authentication nodes 104 a-c.

Note that it is unnecessary for the client device 100 to discover each authentication node 104*a-c* that is to participate in authenticating the client device 100 for network access. As an example, it is possible that the client device 100 may transmit an access request to one of the nodes 104*a-c* and for the node that receives such access request to forward the access request or the credentials in the access request to other authentication nodes. Thus, the transmission of a single access request by the client device 100 may trigger a sufficient number of authentications by authentication nodes 104*a-d* to exceed the threshold TH, thereby authenticating the client device 100 for network access.

Upon receiving an access request from the client device 100 or otherwise receiving credentials of the client device 100, an authentication node 104*a-d* uses one or more authentication methods to authenticate the client device 100, such as challenge-response authentication, public key/asymmetrical key cryptography, Shamir's secret sharing, access control lists, role based access control etc. For example, an authentication node 104*a-d* may use public key encryption to perform authentication using a handshake with public and private keys, or the authentication node 104*a-d* may use challenge-response authentication to perform authentication using the response of the client device 100 to a given challenge by the authentication node 104*a-d*. The authentication node 104*a-d* may also use Shamir's secret sharing to perform authentication using schema and collaborating with other node(s) on the secure network 102. In other embodiments, yet other methods for authentication that are not mentioned herein may be used.

For simplicity of illustration, assume hereafter that each authentication node 104*a-d* performs authentication using credentials received from the client device 100. As an example, for each authorized user, the nodes 104*a-d* may be configured to store a username and password. The access request received from the client device 100 may include such a username and password combination, noting that this information may be protected during communication using encryption, hashing, or other security measures. If the username and password pair in the access request matches a valid username and password pair stored at the respective authentication node 104*a-d*, then the authentication node 104*a-d* may be configured to authenticate the client device 100. As noted above, other techniques for authenticating the client device 100 using information from the client device 100 or otherwise are possible in other embodiments. In addition, other types of credentials may be used for authenticating client devices 100 in other embodiments.

Once an authentication node 104*a-d* has authenticated the client device 100, the authentication node is configured to communicate with other authentication nodes 104*a-d* in order to come to form a consensus as to whether the client device 100 should be authenticated for network access in a network session with the network 102. As noted above, in some embodiments, a consensus that the client device 100 should be authenticated for network access is reached when at least a threshold number TH of authentication nodes 104*a-d* have separately authenticated the user using one or more of the techniques described above. Note that it is unnecessary for the same authentication technique to be used at each authentication node 104*a-d*, although it is possible that the same authentication techniques may be used, if desired.

Figure 3B:
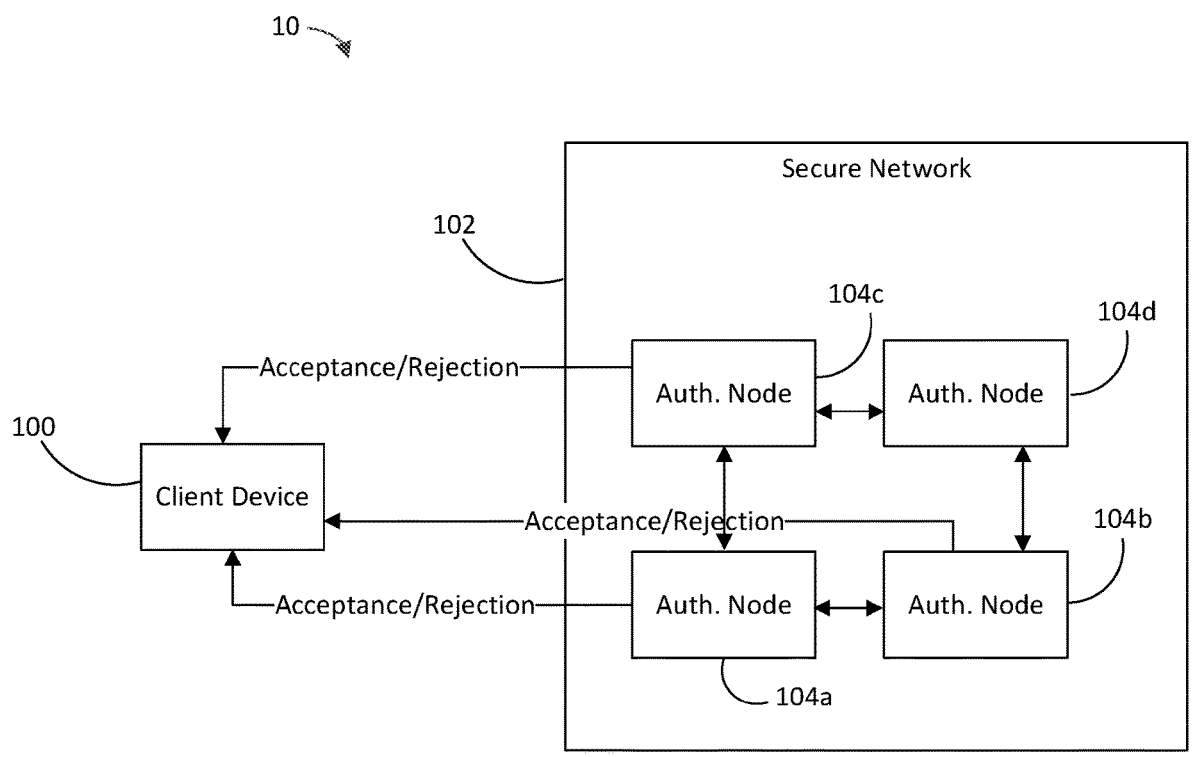
FIG. 3B is a block diagram illustrating the system of FIG. 1 communicating acceptances or rejections sent in response to the requests shown by FIG. 3A.

Thus, in the example described above for which the client device 100 requests network access from the authentication nodes 104*a-c*, the authentication nodes 104*a-c* (after receiving separate access requests from the client device 100) communicate with one another to determine the total number of authentication nodes 104*a-d* that have successfully authenticated the client device 100. If the total number exceeds the threshold TH, then the authentication nodes 104*a-c* may determine that a valid consensus for authenticating the client device 100 for a network session has been reached. If the total number does not exceed the threshold TH, then the authentication nodes 104*a-c* may determine that a valid consensus for authenticating the client has not been reached. After determining whether a consensus has been reached, each of the authentication nodes 104*a-c* may transmit an acceptance or a rejection of the client's previous access request to the client device 100, as shown by FIG. 3B.

Thus, if a consensus of authentication is not reached, each of the authentication nodes 104*a-c* may transmit a rejection of the client device's respective access request, thereby informing the client device 100 that it has not been authenticated. At such point, the client device 100, if desired, may attempt to submit new access requests to the same authentication nodes 104a-c or different authentication nodes of the network 102 such that the aforementioned process is repeated.

However, if a consensus of authentication is reached by the authentication nodes 102a-c, each of the authentication nodes 104a-c may transmit an acceptance of the client device's respective access request. Note that an acceptance or rejection of the client device's access requests may be transmitted by any number of nodes. For example, rather than sending an acceptance (or rejection) from each authentication node 104a-c that received an access request, a single acceptance (or rejection) made be transmitted by any of the authentication nodes 104a-c or other resource of the network 102.

Note that an acceptance transmitted to the client device 100 may include information for enabling it to access resources of the network 102 in a communication session with the network 102. As an example, when an acceptance is transmitted in some embodiments, such acceptance may include a valid token (referred to hereafter as "session token") that is recognized by the resources (e.g., nodes) of the network 102. Such session token may be associated with a time limit and remain valid until expiration of the time limit. While the session token remains valid, the nodes of the network 102 may be configured to respond to messages that include the session token. Thus, after receiving an acceptance from one or more authentication nodes 104a-d, the client device 100 may be configured to insert the session token of the acceptance into messages transmitted by the client device 100 to the resources of the network 102. During the time limit associated with the session token, the nodes of the network 102 should respond to these messages from the client device 100. However, once the session token expires, the resources of the network 102 no longer respond to messages that contain the session token. After this point, the client device 100 may establish a new network session with the network 102 by requesting network access again, using the techniques described above, to obtain a new session token to enable it access the resources of the network 102.

Thus, using the techniques described above, the client device 100 is granted temporary access to the network 102 only if a number of authentication nodes 104a-d greater than the predefined threshold TH come to a consensus that the client device 100 is to be authenticated for network access. Therefore, even if a hacker is able to spoof one authentication node 104a-d into authenticating a client device 100 being used by the hacker, the other authentication nodes should prevent a valid consensus from being reached, thereby preventing the hacker from gaining access to sensitive information within the network 102. In addition, if any authentication node 104a-d goes offline, then the other authentication nodes 104a-d may be able to continue authenticating client devices 100 such that a failure of any one authentication node 104a-d should not disrupt service to users.

In some embodiments described herein, each authentication node 104a-c that receives an access request from the client device 100 may be configured to assess whether a network session should be granted to the client device 100, such as by comparing the total number of nodes that have authenticated the client device 100 to the threshold. However, in some embodiments, such assessment may be performed by less than all (e.g., only one) of the authentication nodes 104a-c, which then communicate the result of the assessment to other nodes of the network 102. In some embodiments, a node that performs such assessment is not necessarily one of the authentication nodes 104a-c that received an access request or that used credentials from an access request to authenticate the client device 100. As an example, the authentication nodes 104a-c that individually authenticate the client device 100 may be configured to transmit information indicative of such authentication to one or more nodes that do not communicate with the client device 100 or receive the credentials of the client device 100. Such one or more nodes may then determine whether to grant a network session to the client device 100 (e.g., by comparing the total number nodes that authenticated the client device 100 to the threshold) and communicate with other nodes of the network 102 accordingly such that a network session is granted to the client device 100. In other embodiments, yet other techniques for assessing whether to grant a network session to the client device 100 based on authentications individually performed by multiple nodes of the network 102 are possible.

Note that the network 102 may use various optimization techniques in an effort to optimize the performance of the network 102, such as reducing needless network traffic. For example, as described above, the authentication nodes 104a-c that receive an access request from the client device 100 may be configured to communicate with one another to arrive at a consensus as to whether the client device 100 should be authenticated. If desired, when an authentication node 104a-d receives an access request, such node may transmit a multicast message (referred to hereafter as "authentication status message") to all of the other authentication nodes 104a-d indicating whether the node has authenticated the client device 100. Thus, each authentication node 104a-d, based on the authentication status messages transmitted by the other authentication nodes 104a-c that received an access request from the client device 100 for a given network session, can individually determine whether a consensus of authentication is reached.

Alternatively, the authentication nodes 104a-c that actually receive an access request from the client device 100 for a given session may communicate authentication status messages among each other, thereby reducing network traffic. In this regard, the access request for a given session received from the client device 100 by a given one of the authentication nodes may identify each of the other authentication nodes 104a-d that are also receiving an access request for the same network session from the client device 100. In this regard, when transmitting an access request, the client device 100 may insert into the request an identifier of each authorization node 104a-d to which the client device 100 is transmitting an access request for the same network session. The authentication nodes 104a-c receiving such request may then use this information to direct an authentication status message to each of the other identified authentication nodes 104a-c using unicast or directed multicast. Thus, the authentication nodes 104a-c that receive an access request for the session from the client device 100 communicate with each other information about whether they have authenticated the client device 100 without necessarily informing the other authentication nodes 104d that did not receive an access request for the session from the client device 100. Using such techniques, total network traffic may be reduced.

In addition, once a set of authentication nodes 104a-c has come to a consensus that the client device 100 is authenticated, then at least one of the nodes 104a-c may transmit a valid session token to the client device 100, as described above. At least one of the authentication nodes 104*a-c* may also be configured to communicate with the other nodes of the network 102 to inform them of the authentication so that they will respond to messages from the client 100. This may be accomplished by communicating the session token to be used by the client device 100 to the other nodes of the network 102 so that they recognize the session token as valid during the client device's authenticated session. As an example, at least one of the authentication nodes 104*a-c* may transmit the session token in a multicast message that is communicated through the network 102. In other embodiments, other techniques for enabling the client device 100, when authenticated, to successfully access and, thus, communicate with the nodes of the network 102 are possible.

In some embodiments, the threshold TH used to determine whether there are a sufficient number of authentication nodes 104*a-d* that have authenticated the client device 100 in order to reach a consensus can be dynamically adjusted based on various factors. For example, the threshold TH may be based on the size of the network 102 such as the number of authentication nodes 104*a-d* that are accessible for performing authentication functions. As noted above, it is possible for the network 102 to be configured such that any node of the network 102 may serve as an authentication node 104*a-d* or such that only certain nodes of the network 102 may serve as an authentication node 104*a-d*. In either case, as the number of authentication nodes 104*a-d* in the network 102 changes, the threshold TH may be updated in a corresponding manner. For example, as the number of authentication nodes 104*a-d* increases, the threshold TH may be increased by a corresponding amount or otherwise, and as the number of authentication nodes 104*a-d* decreases, the threshold TH may be decreased by a corresponding amount or otherwise. As a mere example, the threshold TH may be adjusted such that it remains with a certain percentage or percentage range of the total number of authentication nodes 104*a-d* as such total number changes over time. In other embodiments, the threshold TH may be adjusted based on other factors.

As an example, in some embodiments, the threshold TH may be adjusted based on a time of day or a network performance parameter that indicates a current performance of the network 102. In this regard, using a higher threshold TH generally adds delay to the authentication process and also increases network traffic, but using a higher threshold TH also generally enhances security by requiring a hacker to successfully authenticate with a greater number of nodes before being granted a network session. During peak network traffic periods, the threshold may be reduced in order to reduce delays and traffic, and the threshold may be increased in other periods in order to enhance security. As an example, early morning hours may be a period of relatively low traffic and during a heightened security period when a higher percentage of access requests may be illicit. During such a time period, the threshold may be increased. A historical pattern of network traffic may be used to select times when the threshold is to be adjusted, or the threshold may be adjusted based on one or more runtime conditions, such as the number of authentication nodes that are currently online or a network performance parameter indicative of network performance, such as congestion. In other embodiments, the threshold may be adjusted based on other types of network conditions.

A node of the network 102 that is operating and able to successfully communicate with other devices, including other nodes of the network 102, is referred to herein as "online," whereas a node of the network 102 that is unable to successfully communicate due to an error or anomaly, such as a loss of power, is referred to herein as "offline." The online/offline status of a node is generally discoverable by other nodes of the network. For example, if a first node attempts communication with a second node that fails to respond after a predefined amount of time or number of attempts, then the first node may determine that the second node is offline. If the first node receives a response from the second node, then the first node may determine that the second node is online.

The nodes of the network 102 may communicate with each other to track the online/offline statuses of the nodes. For example, each node may maintain a list of all of the nodes of the network 102 and, for each node, indicate whether the node is currently online or offline. When a first node detects a change in the online/offline status of a second node (i.e., that the online/offline status of the second node has changed relative to its status indicated by the node list), the first node may update its node list and then inform the other nodes of the network of the change. For example, the first node may transmit a multicast message that indicates the online/offline status of the second node so that the other nodes of the network 102 become aware of the current status of the second node and can update their node lists accordingly. When a new node is added to the network 102, the new node may be discovered by the other nodes of the network based on one or more messages transmitted by the new node, and the new node may be added to the node lists such that each node list is kept current.

In some embodiments, the node lists maintained by the nodes of the network 102 may be used to adjust the threshold TH used for establishing a valid consensus. As an example, the node lists may indicate the total number of online authentication nodes 104*a-d* that are currently available, and the threshold may be set or otherwise adjusted based on such number. If desired, when a node determines that the threshold TH is to be adjusted based on the number of online authentication nodes 104*a-d* or otherwise, the node may communicate with other nodes of the network 102 to synchronize the threshold TH across all of the authentication nodes 104*a-d*.

In some embodiments, one or more nodes of the network 102 may be blacklisted from performing certain functions in an effort to enhance the security of the network 102. For example, if one or more nodes detect an event indicating that another node has been compromised, such as by tampering, then the nodes of the network 102 may blacklist the compromised node such that it is prevented from performing one or more functions, such as participating in user authentication. As an example, assume that a hacker is able to manipulate an authentication node 104*c* such that it recognizes a username and password provided by the hacker. In such case, the authentication node 104 may authenticate a client device 100 used by the hacker.

However, using the authentication techniques described above, successfully tampering with or otherwise compromising a single authentication node 104*c* should not result in the hacker being authenticated by and granted access to the network 102. In this regard, if the hacker's device is authenticated by a number of authentication nodes 104*a-d* less than the threshold TH, then the hacker's device should be prevented from being granted a network session by the network 102, as described above. If any of the authentication nodes 104*a-d* determines that another authentication node has been compromised, then such other authentication node 104*a-b* may be blacklisted. As an example, in response to a discrepancy in authentication between the authentication nodes 104a-c, the nodes 104a-c may communicate with each other, such as by comparing password tables or other information that should be synchronized among the nodes 104a-c. If the nodes 104a-b determine a discrepancy that is indicative of tampering of the node 104c, such as for example, the password for a particular username stored by the node 104c does not match the passwords for the same username stored by the nodes 104a-b, thereby indicating that a hacker may have altered the password table of node 104c, the nodes 104a-b may blacklist the node 104c. Note that password alteration is just one example of a type of action that may be performed by a hacker and detected by the nodes 104a-b, and in other examples, other techniques are possible for determining that a node 104c is compromised. As an example, one node can detect the tampering of another node based on various discrepancies, such as change of roles, unmatched hash values, session log data, and other discrepancies.

When a node 104c is blacklisted, the other nodes of the network 102 may be configured to ignore messages (e.g., all messages or messages of a certain type or types) from the blacklisted node 104c. As an example, the blacklisted node 104c may be prevented from participating in user authentication. In such an example, the other nodes of the network 102 do not count any authentication from the blacklisted nodes 104c when determining whether the authentication threshold TH is exceeded. That is, when the authentication nodes 104a, b, d are calculating the total number of authentication nodes that have authenticated a particular client device 100 for a given network session, the nodes 104a, b, d ignore any authentication transmitted or otherwise indicated by the blacklisted node 104c such that the blacklisted node 104c has no effect on the ultimate authentication determination for the network 102. Other functions of the blacklisted node 104c may be prevented in other examples. As an example, a node 104a, b, d may ignore another type of message from the blacklisted node 104c, such as a request to update information at the receiving node.

Note that there are various techniques that may be used to indicate when a node is blacklisted. As an example, as noted above, each node may store a list of all of the nodes of the network 102 to indicate the online/offline status of each node. Such node list may also indicate which nodes are blacklisted. For example, for each node in the node list, there may be one flag indicating whether the corresponding node is online or offline, and there may be another flag indicating whether the corresponding node is blacklisted. When a first node determines that a second node is to be blacklisted, the first node may transmit a multicast message through the network 102 indicating that the second node is to be blacklisted, and the other nodes of the network 102 may be configured to update their respective node lists accordingly. In other embodiments, other techniques for blacklisting nodes are possible.

Note that much of the above description focuses on decentralizing user authentication. However, other security functions may be similarly decentralized using similar techniques. As an example, blacklisting of a node may be performed by a consensus of a plurality of nodes. In this regard, to prevent a single, compromised node from improperly blacklisting uncompromised nodes, the nodes of the network 102 may be configured such that a node is blacklisted only if at least a threshold number of nodes determine that it should be blacklisted. For example, when a first node detects a discrepancy with a second node, the first node may communicate with other nodes to determine whether they agree that the second node should be blacklisted. If at least a threshold number of nodes agree that the second node should be blacklisted, then at least one of the nodes may transmit a message through the network 102 instructing the other nodes to blacklist the second node. If the threshold number is not exceeded, then the nodes may be configured such that no such blacklisting message is communicated through the network 102. In other embodiments, yet other security actions may be performed based whether a minimum number of nodes come to a consensus that the security action should be performed.

What is claimed is:

1. A system for decentralized network management, comprising:
   a client device; and
   a network having at least a plurality of nodes, each of the plurality of nodes configured to receive credentials from the client device and determine whether to authenticate the client device based on the received credentials, wherein at least one node of the network is configured to determine a value indicative of a total number of the plurality of nodes that have authenticated the client device, wherein the at least one node of the network is configured to compare the value to a threshold and to authenticate the client device for a network session with the network based on a comparison of the value to the threshold, and wherein the at least one node is configured to enable, in response to authentication of the client device for the network session, communication between the client device and at least one resource of the network during the network session, wherein at least one node of the network is configured to dynamically adjust the threshold based on a number of nodes of the network currently accessible for authenticating client devices, a time of day, or a parameter indicative of a current performance of the network, wherein at least one node of the network is configured to transmit to the client device a list of nodes permitted to authenticate the client device, and wherein the client device is configured to transmit the credentials to the plurality of nodes based on the list.

2. The system of claim 1, wherein the network is configured to blacklist a first node of the network, in response to a detection of a tampering attempt on the first node, such that the first node is prevented from affecting authentication of the client device for the network session by the at least one node of the network.

3. The system of claim 1, wherein the at least one node is configured to enable the communication by transmitting a session token for the network session to the client device, and wherein the client device is configured to insert the session token in messages transmitted by the client device to the network during the network session.

4. A method for decentralized network management, comprising:
   transmitting to a client device a list of nodes of a network permitted to authenticate the client device;
   receiving credentials from the client device at each of a plurality of nodes of the network, wherein the client device is configured to transmit the credentials to the plurality of nodes based on the list;
   determining, by each of the plurality of nodes, whether to authenticate the client device based on the received credentials;
   determining, by at least node of the network, a value indicative of a total number of the plurality of nodes that have authenticated the client device;

comparing the value to a threshold;
authenticating the client device for a network session with the network based on the comparing;
enabling the client device to access at least one resource of the network during the network session in response to the authenticating the client device for the network session; and
dynamically adjusting the threshold based on a number of nodes of the network currently accessible for authenticating client devices, a time of day, or a parameter indicative of a current performance of the network.

5. The method of claim 4, further comprising:
detecting a tampering attempt on a first node of the network; and
blacklisting the first node in response to the detecting such that the first node is prevented from affecting the authenticating the client device for the network session.

6. The method of claim 4, wherein the enabling comprises transmitting a session token for the network session to the client device.

7. A method, comprising:
transmitting to a client device a list of nodes of a network permitted to authenticate the client device;
receiving, by a first node of a network from a client device, credentials associated with the client device;
receiving the credentials by a second node of a network from the client device, wherein the client device is configured to transmit the credentials to the first node and the second node based on the list;
determining, by the first node, whether to authenticate the client device based on the credentials received by the first node;
determining, by the second node, whether to authenticate the client device based on the credentials received by the second node;
forming a consensus among a plurality of nodes of the network, including at least the first node and the second node, whether to authenticate the client device for a network session with the network, wherein the forming is based on the determining whether to authenticate the client device by the first node and the determining whether to authenticate the client device by the second node, the forming comprising comparing a value indicative of a total number of the plurality of nodes that authenticate the client device to a threshold;
enabling the client device to communicate with the network during the communication based on the consensus if the consensus is to authenticate the client device for the network session; and
dynamically adjusting the threshold based on a number of nodes of the network currently accessible for authenticating client devices, a time of day, or a parameter indicative of a current performance of the network.

8. The method of claim 7, further comprising:
detecting a tempering attempt on a third node of the network; and
blacklisting the third node in response to the detecting such that the third node is prevented from participating in the consensus.

9. The method of claim 7, where in the enabling comprises transmitting a session token for the network session to the client device.

* * * * *